United States Patent [19]
Kirby

[11] Patent Number: 5,640,930
[45] Date of Patent: Jun. 24, 1997

[54] AUTOMATIC CLEANING AQUARIUM

[76] Inventor: Michael J. Kirby, 603 Truesdell Ave., Altamonte Springs, Fla. 32701

[21] Appl. No.: 516,377

[22] Filed: Aug. 17, 1995

[51] Int. Cl.⁶ ............................................ A01K 63/04
[52] U.S. Cl. ............................ 119/263; 119/264
[58] Field of Search ........................... 119/248, 226, 119/228, 259, 264, 263

[56] References Cited

U.S. PATENT DOCUMENTS

| | | | |
|---|---|---|---|
| 649,494 | 5/1900 | Sues | 119/264 |
| 950,999 | 3/1910 | Marquardt | 119/264 |
| 3,638,616 | 2/1972 | Carmouche | 119/261 |
| 3,759,223 | 9/1973 | D'Andrea | 119/259 |
| 3,854,450 | 12/1974 | Puckett | 119/248 |
| 4,528,940 | 7/1985 | Litzburg | 119/248 |
| 4,708,089 | 11/1987 | Goldman et al. | 119/248 |
| 4,817,561 | 4/1989 | Byrne et al. | 119/260 |
| 4,944,248 | 7/1990 | Torng | 119/264 |
| 4,957,623 | 9/1990 | Henzlik | 210/169 |
| 4,972,801 | 11/1990 | Hunt | 119/263 X |
| 5,179,911 | 1/1993 | Chow et al. | 119/264 |
| 5,290,437 | 3/1994 | Lin | 119/264 X |
| 5,367,985 | 11/1994 | Wilkins | 119/263 |

FOREIGN PATENT DOCUMENTS

| | | |
|---|---|---|
| 195443 | 2/1908 | Germany. |
| 312-268 | 1/1983 | Germany ............... 119/245 |
| 4060-22663 | 2/1994 | Japan ............... 119/264 |
| 2032792 | 9/1979 | United Kingdom. |

*Primary Examiner*—Robert P. Swiatek
*Assistant Examiner*—Elizabeth Shaw
*Attorney, Agent, or Firm*—Edward M. Livingston, Esq.

[57] ABSTRACT

An automatic cleaning aquarium has a top aquatic section (1) with vertical walls (2) and a bottom waste section (3) having tapered walls (4) which funnel to a valved flushing orifice (5). A grate-supported screen (8, 9) separates the top aquatic section from the bottom waste section. The valved flushing orifice and a discharge conveyance (11) are large enough to permit effectively fast flushing of the grate-supported screen and the tapered walls of the bottom waste section. Positioning of the valved flushing orifice can be designed for various sizes and uses of the aquariums. Air for aeration and circulation of water in the aquarium is supplied centrally or optionally through an aeration pipe (17) extended near end-to-end and having a plurality of aeration orifices (20). A water tap or a pail with suitable water can be used to refill the top aquatic section after flushing.

20 Claims, 2 Drawing Sheets

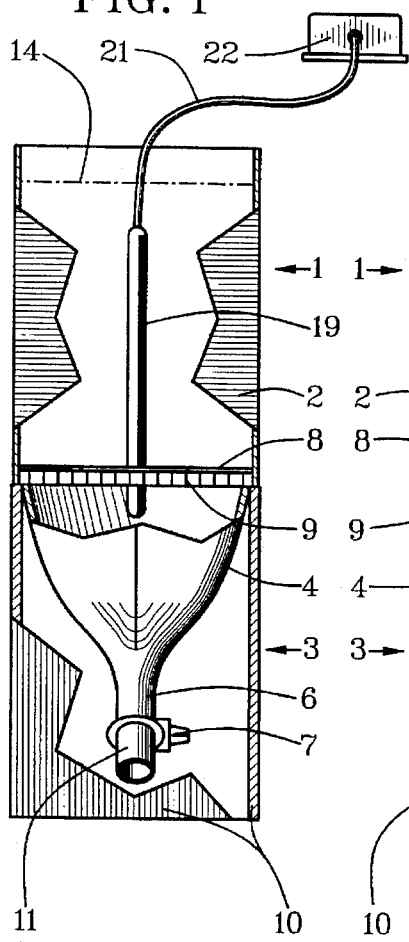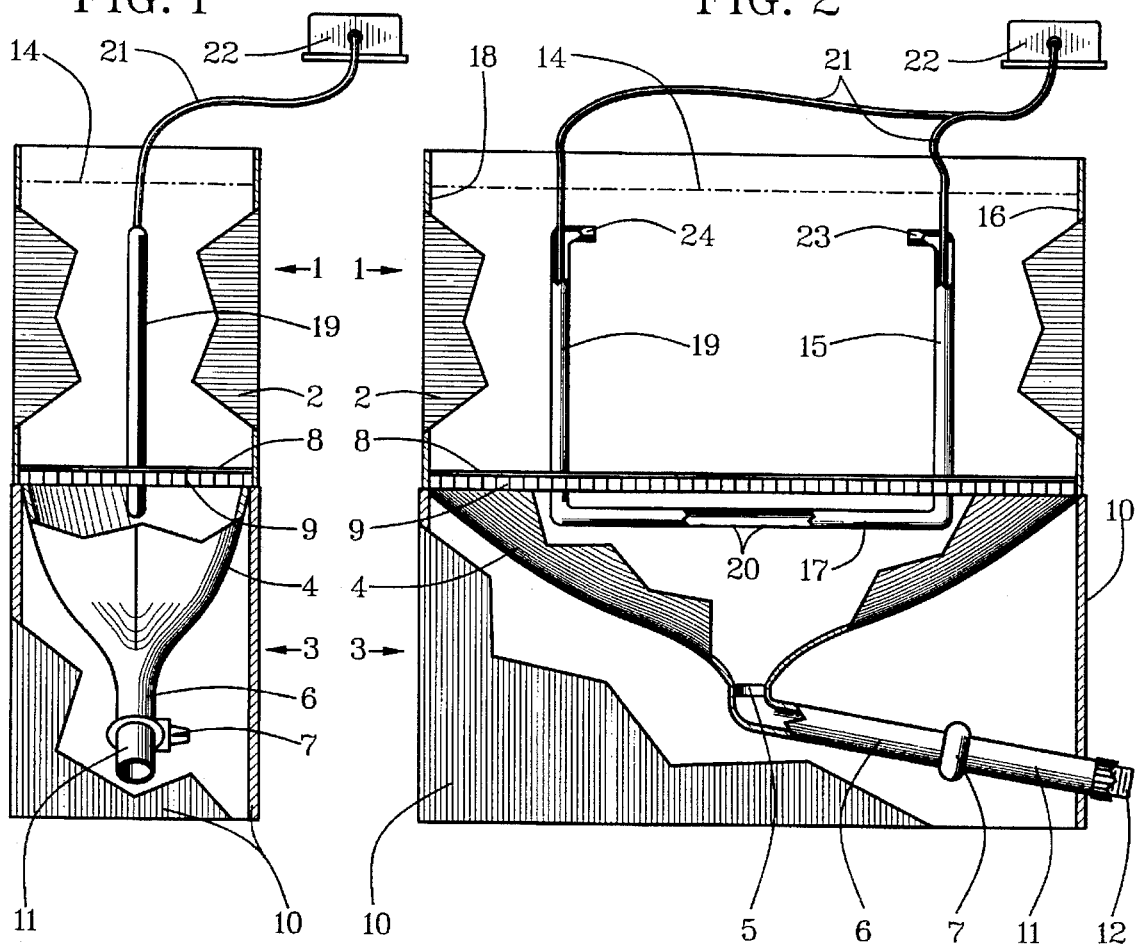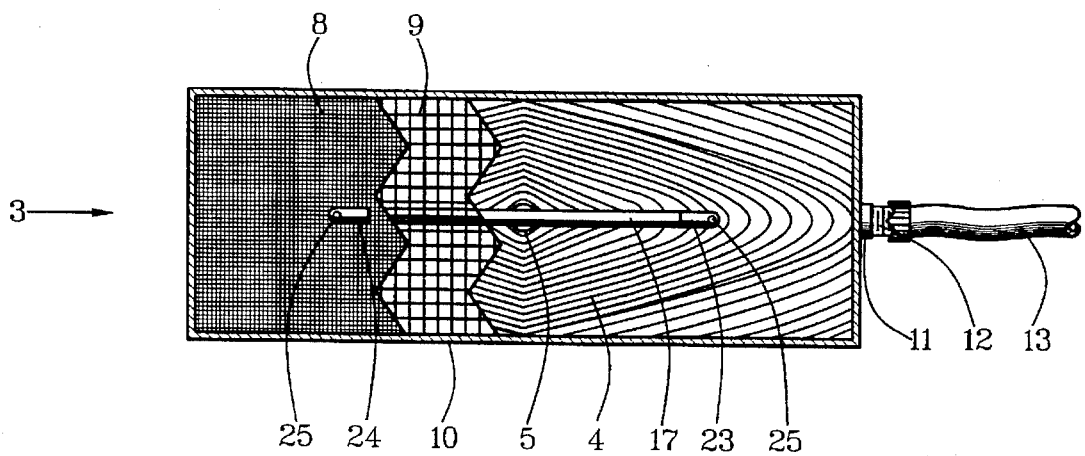

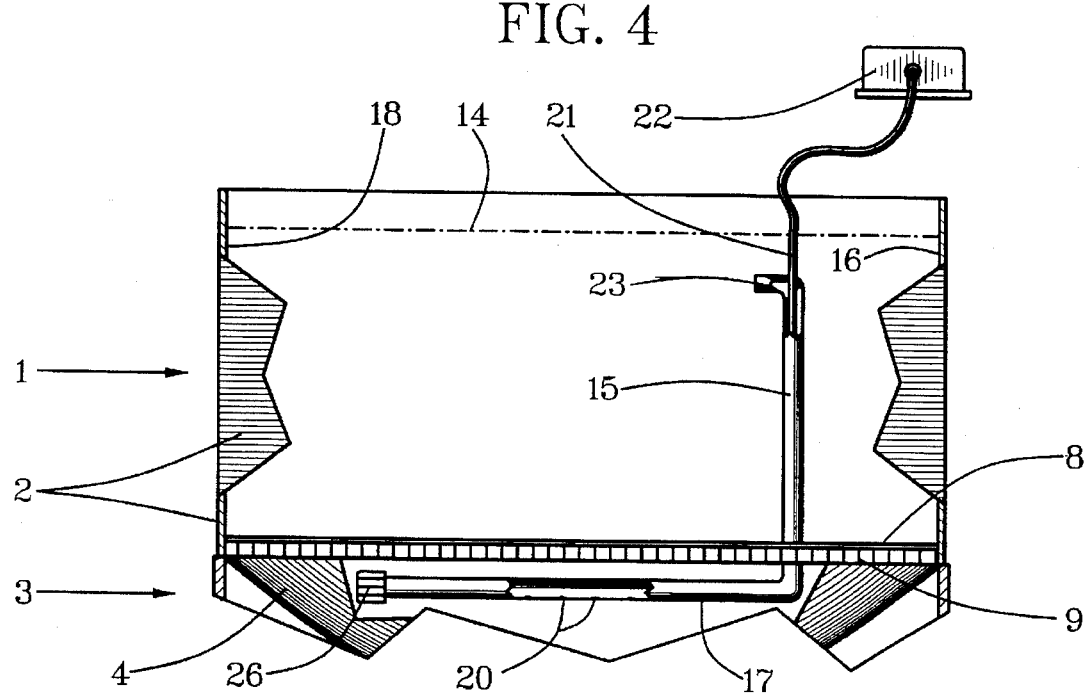
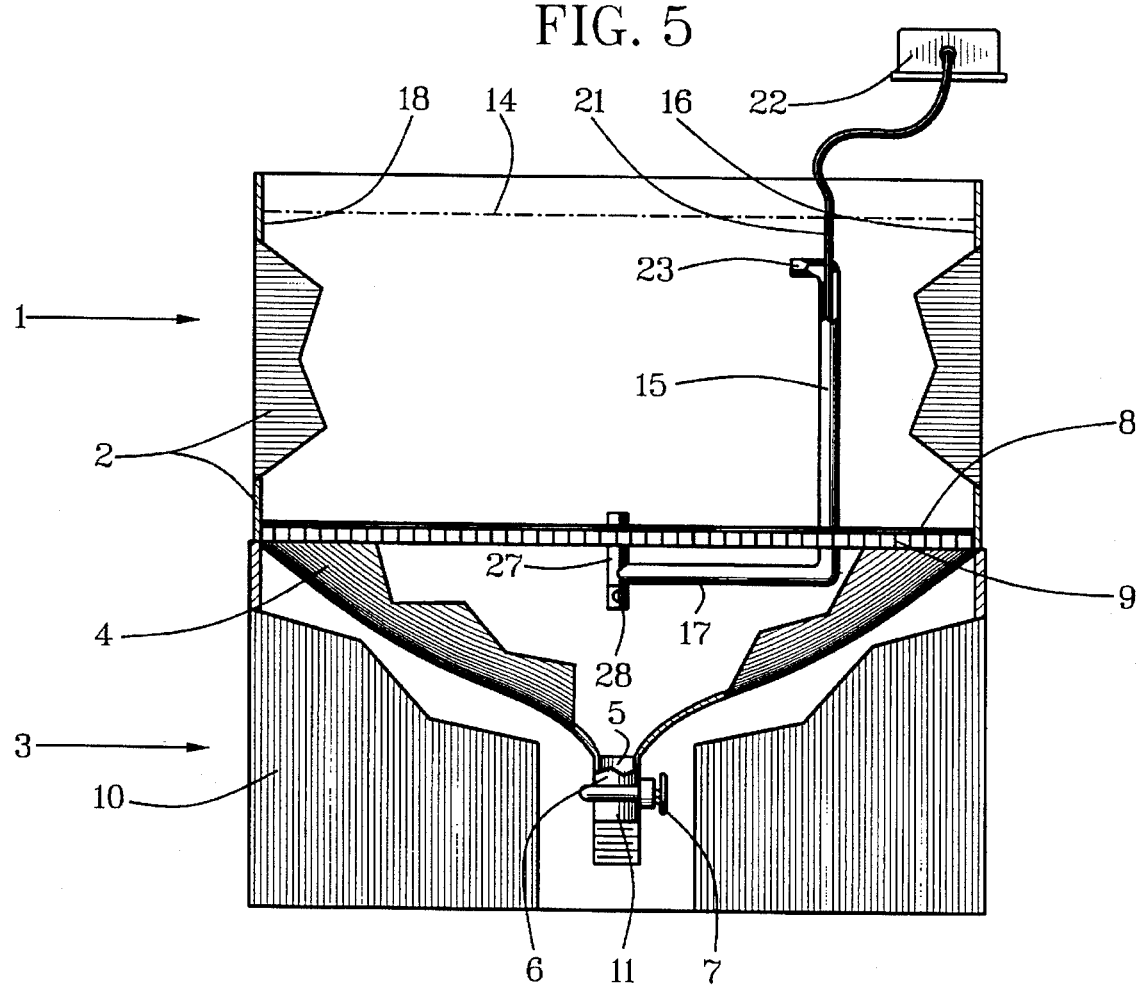

5,640,930

AUTOMATIC CLEANING AQUARIUM

BACKGROUND OF THE INVENTION

This invention relates to aquariums and in particular to aquariums with sediment troughs which allow cleaning of aquariums without manually replacing their water, aquatic life and other contents.

Presently there is no effective means known for cleaning an aquarium without first manually removing all of the aquatic life, which is primarily fish, water and ornamental items. Usually, this must be done about every week to protect aquatic life and to prevent objectionable odors that result from feces, decayed food particles and bacteria that accumulate in the aquariums. It is a very time-consuming burden on the pleasure and business of fish culture.

A system for screening a fish section in a top from a waste section in a bottom of an aquarium and then flushing out the waste section developed gradually in known prior art. But it has not been developed to a practical and commercially successful state in the manner taught by this invention. Aquarists still rely on the traditional laborious cleaning method involving the tasks of dipping out water pailful-by-pailful or siphoning it out; putting the aquatic life in a separate container; hand-cleaning their aquariums; and then replacing the aquatic life and all ornamental articles manually after putting in new water.

One of the first-known labor-saving means for cleaning aquariums or keeping them clean is described in U.S. Pat. No. 649,494, issued to Sues on May 15, 1900. At a bottom dihedral of a V-shaped aquarium, it had a discharge tube with inlet orifices on top of the tube for receiving waste from the aquarium. However, food mixed with the waste on a layer of sand bridging between opposite sides at the bottom and on an edge of the tube. There, fish seeking food were relied on to agitate the waste and the food to make the waste fall into the discharge tube. The fish were obliged to select food from among their feces and much of it along with the feces and other waste went into the tube. It was an attempt at keeping an aquarium clean but actually did more harm than good. It was not successful.

The most successful known means for keeping an aquarium clean or for cleaning it when it got dirty was described in U.S. Pat. No. 3,638,616, issued to Carmouche on Feb. 1, 1972. Its practicality was limited, however, to commercial fish farming with aquariums to compete with commercial fish ponds for producing fish for food on a large scale. The Carmouche patent claimed a composite of items and features that make practice of the invention very impractical and in some ways undesirable for ornamental aquatic culture. Eliminating some and changing other features of the Carmouche device as taught and claimed was essential for most aquatic culture not related to producing fish for food commercially. It had a large waste section with a separate slanted filter protruding from a single slanted wall to partially clean waste in the waste section to accommodate high density of fish. It did not teach nor provide an adequate flushing rate of removal of water in the waste section. It relied solely on a continuous supply of water from a tap, instead of optional periodic replacement of water with other means. Making it unusable in a building, on a floor or on a rug, it incorporated an overflow tank that limited it to use outside on the ground where water from the overflow tank could run onto the ground. A ball valve to which it was limited for outlet-valve control was not efficient in use of liquid mass of water above it for assuring valve sealing when not flushing. With air bubbles on a side to cause water circulation, it caused fish to seek the air bubbles from only half as much of the volume of water as from a central positioning of aeration air bubbles.

Other known aquarium-cleaning devices employing a bottom waste section screened from a top fish section of an aquarium have had slower flushing with confined flow and less flushing effect with horizontal bottoms of the bottom waste sections. Included have been U.S. Pat. No. 5,179,911, issued to Chow, et al. on Jan. 19, 1993; U.S. Pat. No. 4,957,623, issued to Henzlik on Sep. 18, 1990; U.S. Pat. No. 4,944,248, issued to Torng on Jul. 31, 1990; U.S. Pat. No. 4,817,561, issued to Byrne, et al. on Apr. 4, 1989; U.S. Pat. No. 3,854,450, issued to Puckett on Dec. 17, 1974; and British Published Application Number 2,032,792, filed by Shawcross on Sep. 19, 1979. These horizontal-bottom and slow-flow types of cleaning devices have not been widely accepted.

SUMMARY OF THE INVENTION

In light of product deficiencies that have existed and that continue to exist in this field, objectives of this invention are to provide an automatic cleaning aquarium which:

Can be cleaned quickly and easily whenever desired without having to remove and replace aquatic life and ornamentation;

Separates contaminants from aquatic life in aquariums;

Removes contaminated water at a sufficiently rapid rate that contaminants are flushed out thoroughly from a screen which separates a top aquatic section from a bottom waste section and cleans surfaces of the bottom waste section; and Has an effective air-supply system.

This invention accomplishes these and other objectives with an automatic cleaning aquarium having a top aquatic section with vertical walls and a bottom waste section having tapered walls which funnel to a valved flushing orifice. A grate-supported screen separates the top aquatic section from the bottom waste section. The valved flushing orifice and a discharge conveyance are large to permit effectively fast flushing of the grate-supported screen and the tapered walls of the bottom waste section. Positioning of the valved flushing orifice can be designed for various sizes and uses of the aquariums. Air for aeration and circulation of water in the aquarium is supplied centrally or optionally through an aeration pipe extended designedly near end-to-end and having a plurality of aeration orifices. A tap or a pail with suitable water can be used to refill the top aquatic section after flushing.

The above and other objects, features and advantages of the present invention will become apparent to those skilled in the art upon a reading of the following detailed description when taken in conjunction with the drawings wherein there is shown and described an illustrative embodiment of the invention.

BRIEF DESCRIPTION OF DRAWINGS

This invention is described by appended claims in relation to description of a preferred embodiment with reference to the following drawings which are described briefly as follows:

FIG. 1 is a cutaway end view;

FIG. 2 is a cutaway side view;

FIG. 3 is a partially cutaway top view of a bottom waste section covered by a grate and a screen;

FIG. 4 is a sectional cutaway view of a top aquatic section and a top portion of a bottom waste section with a plugged aeration tube; and FIG. 5 is a cutaway side view with a central hand-operated valve and a central aeration tube.

DESCRIPTION OF PREFERRED EMBODIMENTS

Reference is made first to FIGS. 1–3. A top aquatic section 1 has vertical walls 2 and a bottom waste section 3 having designedly coned walls 4 which funnel downward to a flushing orifice 5 with a discharge conveyance 6 having a hand-operable valve 7. A screen 8 on a grate 9 separates the top aquatic section 1 from the bottom waste section 3 and forms a porous floor of the top aquatic section 1. The grate 9 is rigid and has larger mesh orifices than the screen 8. The top aquatic section 1 and the bottom waste section 3 can be supported by a stand 10 of a variety of shapes that have walls that are preferably vertical or vertical. An outlet tube 11 on an outlet side of the hand-operable valve 7 can be plain as shown in FIG. 1 for emptying into a container or it can be sized and shaped with threads 12 for attachment of a desired hose 13 to discharge waste water.

Normally, water in the top aquatic section 1 is maintained at a water level 14. There is one body of water in both the top aquatic section 1 and the bottom waste section 3. The screen 8, however, prevents passage of aquatic life from the top aquatic section 1 to the bottom waste section 3. Only waste such as excretion from the aquatic life and disintegrated food particles can pass through the screen 8. Microbiotic forms of life also pass through the screen 8, making the bottom waste section 3 an effective collector of waste materials.

Volumetric capacity of the bottom waste section 3 is a portion of volumetric capacity of the top aquatic section 1. To save space, the volumetric capacity of the bottom waste section 3 can be considerably less than one-half of the volumetric capacity of the top aquatic section 1. To provide greater flushing options, however, the volumetric capacity of the bottom waste section 3 can be greater than one-half of the volumetric capacity of the top aquatic section 1.

Flushing or automatic cleaning is accomplished by releasing water at preferably full flow rate through the hand-operable valve 7 until preferably all waste water in the bottom waste section 3 is discharged through the outlet tube 11 to a container or through the hose 13 to a desired discharge destination. The water level 14 drops accordingly. To the extent that the bottom waste section 3 is smaller than the top aquatic section 1, aquatic life will remain in water when the bottom waste section 3 has been fully flushed. Greater or lesser amounts of flushing flow can be controlled by time and extent to which the hand-operable valve 7 is opened. Fast flow through the hand-operable valve 7 is preferable for a washing or cleaning effect on surfaces of both the top aquatic section 1 and the bottom waste section 3. The screen 8 and the grate 9 also are cleaned more effectively with fast-flow flushing through the hand-operable valve 7.

The coned walls 4 of the bottom waste section can be curved as shown or straight-walled. Steepness and absence of corners and crevices are preferable for whatever form of coned shape is employed.

Aeration is provided by preferably central discharge of air from below the grate 9 and screen 8. As depicted in FIGS. 2–3, a preferred aeration circuit has a first aeration tube 15 positioned vertically upright in the aquarium at a selected distance from a first end 16. A top end of the first aeration tube 15 is positioned designedly below water level 14. A bottom end of the first aeration tube 15 is extended through the screen 8 and the grate 9, which are a screening means, where a horizontal outlet section 17 is extended a selected distance towards a second end 18 to a second aeration tube 19 that is extended vertically upward through the screening means to an approximate height of the first aeration tube 15. Aeration orifices 20 in preferably a bottom side of the horizontal outlet section 17 allow escape of air up through the screening means and water in the top aquatic section 1 where oxygen from the aeration air can be accessed by a large portion of aquatic life. Aeration air can be supplied through air lines 21 from a conventional aeration pump 22.

A first elbow cap 23 on top of the first aeration tube 15 and a second elbow cap 24 on top of the second aeration tube 19 can be provided to direct large amounts of air through the aeration tubes 15 and 19 for cleaning out the aeration system periodically. For this function, either the first elbow cap 23 or the second elbow cap 24 can be left open for air-flushing and creating turbulence in the bottom waste section 3. Both elbow caps 23 and 24 can then be closed for blowing out the aeration orifices 20. Preferably air-flushing is accomplished just before water-flushing through the hand-operable valve 7. The air lines 21 can remain in air-line-attachment orifices 25 in the elbows 23 and 24 or the air-line attachment orifices 25 can be variously plugged while air-flushing is being accomplished.

With only the first aeration tube 15, as shown in FIG. 4, an aeration plug 26 can be positioned on the horizontal outlet section 17 to direct aeration air out through the aeration orifices 20.

Optionally with only the first aeration tube 15, as shown in FIG. 5, a vertical outlet tube 27 can be extended downward from a terminal end of the horizontal outlet section 17 and have at least one outlet orifice 28. For this option, there need not be aeration orifices 20 in the horizontal outlet section 17.

The outlet tube 11 and the hand-operable valve 7 can be directed downward vertically when using proportionately higher stands 10 for various applications and use conditions as illustrated in FIG. 5. This may be preferable for growing fish commercially for aquariums. It can be used also for smaller aquariums to hide the hand-operable valve 7 and outlet tube 11 when not in use. When used, the aquarium can be lifted or set on a platform of sorts for flushing and automatic cleaning.

A new and useful automatic cleaning aquarium having been described, all such modifications, adaptations, substitutions of equivalents, combinations of parts, applications and forms thereof as described by the following claims are included in this invention.

Having thus described my invention, I claim:

1. An automatic cleaning aquarium comprising:

a top aquatic section having vertical walls;

a bottom waste section having conical walls which funnel downward from bottoms of the vertical walls to a flushing orifice;

the bottom waste section having a volumetric capacity equal to a selected portion of a volume of the top aquatic section;

the flushing orifice having a cross-sectional area for discharge of fluid from the bottom waste section at a selected flushing rate;

a discharge conveyance in communication from the flushing orifice extending to a hand-operable valve;

a screening means proximate a joinder of bottom edges of the vertical walls and top edges of the bottom waste section;

a first aeration tube-positioned vertically upright in the aquarium at a distance from a first end wall of the aquarium;

a top end of the first aeration tube positioned proximate a top surface of water in the aquarium;

a bottom end of the first aeration tube extended through the screening means to a selected position vertically below the screening means;

a horizontal outlet section of the first aeration tube in fluid communication with the bottom end of the first aeration tube;

the horizontal outlet section extending horizontally from the bottom end of the first aeration tube for a distance in a direction designedly towards a second end of the aquarium; and air outlet orifices in the horizontal outlet section.

2. An automatic cleaning aquarium as described in claim 1 wherein:

taper of the conical walls of the bottom waste section in combination with selected cross-sectional area of the flushing orifice allow a design rate of flow of waste water from the bottom waste section when the hand operable valve is open fully.

3. An automatic cleaning aquarium as described in claim 2 wherein:

the selected rate of flow of waste water from the bottom waste section is sufficient to cause a flushing effect on inside peripheral surfaces of the walls of the bottom waste section.

4. An automatic cleaning aquarium as described in claim 3 and further comprising:

an outlet tube on an outlet portion of the hand-operable valve for directing the waste water into a desired container for disposal.

5. An automatic cleaning aquarium as described in claim 4 and further comprising:

a hose connection on the outlet tube sized and shaped for attachment of a desired hose to the outlet tube.

6. An automatic cleaning aquarium as described in claim 1 and further comprising:

an outlet tube on an outlet portion of the hand-operable valve for directing the waste water into a desired container for disposal.

7. An automatic cleaning aquarium as described in claim 6 and further comprising:

a hose connection on the outlet tube sized and shaped for attachment of a desired hose to the outlet tube.

8. An automatic cleaning aquarium as described in claim 7 and further comprising:

an aquarium stand having a plurality of vertical walls; and tops of the vertical walls of the aquarium stand being attachable to bottoms of the vertical walls of the aquarium proximate a position of attachment of the conical walls of the bottom waste section to the vertical walls of the aquarium.

9. An automatic cleaning aquarium as described in claim 1 and further comprising:

an aquarium stand having a plurality of designedly vertical walls; and tops of the designedly vertical walls of the aquarium stand being attachable to bottoms of the designedly vertical walls of the aquarium proximate a position of attachment of the designedly coned walls of the bottom waste section to the designedly vertical walls of the aquarium.

10. An automatic cleaning aquarium as described in claim 1 wherein:

the screening means is a net having mesh orifices sized and shaped to prevent passage of desired aquatic life and desired articles in the aquarium while allowing passage of feces and waste products related to culture of the desired aquatic life;

the net is positioned on a grate that is rigid;

the grate having larger mesh orifices than the net;

the grate is oriented horizontally and extended between the vertical walls of the aquarium at a position proximate a joinder of tops of the walls of the bottom waste section and the top aquatic section, such that the screening means forms a bottom of the aquarium that separates the top aquatic section from the bottom waste section.

11. An automatic cleaning aquarium as described in claim 3 wherein:

the screening means is a net having mesh orifices sized and shaped to prevent passage of desired aquatic life and desired articles in the aquarium while allowing passage of feces and waste products related to culture of the desired aquatic life;

the net is positioned on a grate that is rigid;

the grate having larger mesh orifices than the net;

the grate is oriented horizontally and extended between the vertical walls of the aquarium at a position proximate a joinder of tops of the walls of the bottom waste section and the top aquatic section, such that the screening means is a bottom of the aquarium that separates the top aquatic section from the bottom waste section.

12. An automatic cleaning aquarium as described in claim 1 and further comprising:

a plug on an outlet end of the horizontal outlet section.

13. An automatic cleaning aquarium as described in claim 1 and further comprising:

a second aeration tube extended vertically upright from an outlet end of the horizontal outlet section; and the second aeration tube being extended through the screening means and terminating with a top end of the second aeration tube at a height proximate a height of the top of the first aeration tube, such that at least one air-supply tube can be extended into at least the first aeration tube or the second aeration tube.

14. An automatic cleaning aquarium as described in claim 13 and further comprising:

a first elbow cap on the top end of the first aeration tube;

a second elbow cap on the top end of the second aeration tube; and the first elbow cap and the second elbow cap being attachable to air-supply means, such that pressured air can be directed into either the first aeration tube or the second aeration tube for blowing debris from the horizontal outlet section.

15. An automatic cleaning aquarium as described in claim 12 and further comprising:

a first elbow cap on the top end of the first aeration tube; and the first elbow cap being attachable to air-supply means, such that pressured air can be directed into the first aeration tube for blowing debris from the horizontal outlet section through the air outlet orifices in the horizontal outlet section.

16. An automatic cleaning aquarium as described in claim 3 and further comprising:
- a first aeration tube positioned vertically upright in the aquarium at a distance from a first end wall of the aquarium;
- a top end of the first aeration tube positioned designedly proximate a top surface of water in the aquarium;
- a bottom end of the first aeration tube extended through the screening means to a position vertically below the screening means;
- a horizontal outlet section of the first aeration tube in fluid communication with the bottom end of the first aeration tube;
- the horizontal outlet section extending horizontally from the bottom end of the first aeration tube for a distance in a direction designedly towards a second end of the aquarium; and
- air outlet orifices in the horizontal outlet section.

17. An automatic cleaning aquarium as described in claim 16 and further comprising:
- a plug on an outlet end of the horizontal outlet section.

18. An automatic cleaning aquarium as described in claim 16 and further comprising:
- a second aeration tube extended vertically upright from an outlet end of the horizontal outlet section; and
- the second aeration tube being extended through the screening means and terminating with a top end of the second aeration tube at a height proximate a height of the top of the first aeration tube, such that at least one air-supply tube can be extended into at least the first aeration tube or the second aeration tube.

19. An automatic cleaning aquarium as described in claim 18 and further comprising:
- a first elbow cap on the top end of the first aeration tube;
- a second elbow cap on the top end of the second aeration tube; and
- the first elbow cap and the second elbow cap being attachable to air-supply means, such that pressured air can be directed into either the first aeration tube or the second aeration tube for blowing debris from the horizontal outlet section.

20. An automatic cleaning aquarium as described in claim 17 and further comprising:
- a first elbow cap on the top end of the first aeration tube; and
- the first elbow cap being attachable to air-supply means, such that pressured air can be directed into the first aeration tube for blowing debris from the horizontal outlet section through the air outlet orifices in the horizontal outlet section.

* * * * *